United States Patent
Patat et al.

(10) Patent No.: US 10,827,763 B2
(45) Date of Patent: Nov. 10, 2020

(54) METHOD FOR THE PROPHYLACTIC TREATMENT OF A FOOD PRODUCT SILO

(71) Applicant: SOLVAY SA, Brussels (BE)

(72) Inventors: Olivier Patat, Paris (FR); Jean-Philippe Pascal, Villers les Nancy (FR)

(73) Assignee: SOLVAY SA, Brussels (BE)

(*) Notice: Subject to any disclaimer, the term of this patent is extended or adjusted under 35 U.S.C. 154(b) by 0 days.

(21) Appl. No.: 15/508,691

(22) PCT Filed: Sep. 4, 2015

(86) PCT No.: PCT/EP2015/070227
§ 371 (c)(1),
(2) Date: Mar. 3, 2017

(87) PCT Pub. No.: WO2016/034704
PCT Pub. Date: Mar. 10, 2016

(65) Prior Publication Data
US 2017/0280736 A1 Oct. 5, 2017

(30) Foreign Application Priority Data

Sep. 4, 2014 (FR) ........................ 1458282
Dec. 22, 2014 (FR) ........................ 1463084

(51) Int. Cl.
| | | |
|---|---|---|
| A23B 9/30 | (2006.01) |
| A01N 59/00 | (2006.01) |
| A01N 25/04 | (2006.01) |
| A01N 55/02 | (2006.01) |
| A01N 59/02 | (2006.01) |
| A01N 59/04 | (2006.01) |
| A01N 59/06 | (2006.01) |

(52) U.S. Cl.
CPC ............. *A23B 9/30* (2013.01); *A01N 25/04* (2013.01); *A01N 55/02* (2013.01); *A01N 59/00* (2013.01); *A01N 59/02* (2013.01); *A01N 59/04* (2013.01); *A01N 59/06* (2013.01)

(58) Field of Classification Search
CPC . B32B 15/043; B32B 2264/102; B32B 33/00; A23B 9/30; A01N 59/06; A01N 59/00; A01N 55/02
See application file for complete search history.

(56) References Cited

U.S. PATENT DOCUMENTS

| | | |
|---|---|---|
| 4,043,902 A | 8/1977 | Hartjens et al. |
| 5,122,518 A | 6/1992 | Vrba |
| 5,342,630 A | 8/1994 | Jones |
| 5,439,690 A | 8/1995 | Knight |
| 5,576,007 A | 11/1996 | Ikeda et al. |
| 5,773,017 A | 6/1998 | Korunic et al. |
| 5,830,512 A | 11/1998 | Vrba |
| 6,342,535 B1 | 1/2002 | Bessette et al. |
| 2002/0172713 A1 | 11/2002 | Einziger et al. |
| 2003/0099680 A1 | 5/2003 | Guerassimoff |
| 2006/0040031 A1 | 2/2006 | Pascal et al. |
| 2006/0159777 A1 | 7/2006 | Pascal et al. |
| 2007/0037706 A1 | 2/2007 | Palangie et al. |
| 2008/0171069 A1 | 7/2008 | Pascal et al. |
| 2008/0213327 A1 | 9/2008 | Pascal et al. |
| 2010/0172947 A1 | 7/2010 | Palangie et al. |
| 2012/0003281 A1 | 1/2012 | Pascal et al. |

FOREIGN PATENT DOCUMENTS

| | | |
|---|---|---|
| CN | 102815725 A | 12/2012 |
| EP | 0579951 A1 | 6/1993 |
| FR | 2848780 A1 | 6/2004 |
| JP | 5785990 A | 5/1982 |
| JP | 59142895 A | 8/1984 |
| JP | 5039206 A | 2/1993 |
| JP | 5201818 A | 8/1993 |
| JP | 632706 A | 2/1994 |
| JP | 06040806 A | 2/1994 |
| WO | WO 98/38867 A1 | 9/1998 |
| WO | WO 01/35744 A1 | 5/2001 |
| WO | WO 02/102158 A1 | 12/2002 |
| WO | WO 2004/056183 A1 | 7/2004 |
| WO | WO 2004/056184 A1 | 7/2004 |
| WO | WO 2005/025317 A1 | 3/2005 |
| WO | WO 2006/097480 A1 | 9/2006 |
| WO | WO 2006/097504 A2 | 9/2006 |
| WO | WO 2007/045608 A1 | 4/2007 |
| WO | WO 2010/002980 A2 | 1/2010 |
| WO | WO 2012/085218 A1 | 6/2012 |
| WO | WO 2012/152952 A1 | 11/2012 |
| WO | WO 2013/092694 A1 | 6/2013 |
| WO | WO 2014/001417 A1 | 1/2014 |

OTHER PUBLICATIONS

AMIS (AMIS Crop Calendar, 2012, p. 18-21) (Year: 2012).*

(Continued)

*Primary Examiner* — Kortney L. Klinkel

(74) *Attorney, Agent, or Firm* — Beatrice C. Ortego

(57) ABSTRACT

A method for the prophylactic treatment of the development of parasites in a food product storage silo, the food product storage generating the deposit of food product scraps and/or dust on the walls of the silo, said prophylactic treatment method comprising the application, to at least one part of the walls, of a layer comprising at least 10 g of mineral per m² of wall, the mineral being chosen from: an alkali metal bicarbonate, an alkaline-earth metal carbonate, an alkali metal sulphate, an alkaline-earth metal sulphate, an alkaline-earth metal oxide, and mixtures thereof; the mineral being in the form of particles having an average diameter of at most 200 μm; and said method being characterized in that the application of the layer is carried out after emptying of the silo, on food product scraps and/or dust deposited on the walls of the silo.

12 Claims, No Drawings

(56) References Cited

OTHER PUBLICATIONS

Farber, Farber on mechanics of claim drafting, Chapter 4, Method or Process claims, 2008, p. 4-1 to 4-45 (Year: 2008).*
David A. Depasquale, et al; *Ammonium bicarbonate inhibition of mycotoxigenic fungi and spoilage yeasts*; Journal of Food Protection, vol. 53(4), pp. 324-328, 1990.
Paul Fields; Diatoms Industrial Use: *Diatomaceous earth as insecticide*; Eureka: Diatoms-Nature's Germs; Aug. 2, 2002, pp. 1-6, XP002344782.
U.S. Appl. No. 14/556,308, Palangie et al, filed Dec. 1, 2014.
U.S. Appl. No. 14/610,517, Pascal et al, filed Jan. 30, 2015.
U.S. Appl. No. 14/614,477, Pascal et al, filed Feb. 5, 2015.
U.S. Appl. No. 13/994,831, Pascal et al, filed Jun. 17, 2013.
U.S. Appl. No. 14/115,898, Lefevre et al, filed Nov. 6, 2013.
U.S. Appl. No. 14/366,083, Lefevre et al, filed Jun. 17, 2014.
"Acari" extracted online from Wikipedia on May 13, 2020 at httbs://en.wikipedia.orci/wiki/Acari (4 pg.).
"Insects" extracted online from Wikipedia on May 13, 2020 at https://en.wikipedia.org/wiki/Insect (20 pg.).
"Mediterranean flour moth" (*Ephestia kuehniella*)) extracted online from Wikipedia on May 13, 2020 at https://en.wikipedia.org/wiki/Mediterranean_flour_moth (5 pg.).
"Rice weevil" (*Sitophilus oryzae*) extracted online from Wikipedia on May 13, 2020 at https://en.wikipedia.org/wiki/Rice_weevil (3 pg.).
"Confused flour beetle" (*Tribolium confusum*) extracted online from Wikipedia on May 13, 2020 at https://en.wikipedia.org/wiki/Confused_flour_beetle (2 pg.).

\* cited by examiner

METHOD FOR THE PROPHYLACTIC TREATMENT OF A FOOD PRODUCT SILO

CROSS-REFERENCE TO RELATED APPLICATIONS

This application is a U.S. national stage entry under 35 U.S.C. § 371 of International Application No. PCT/EP2015/070227 filed Sep. 4, 2015, which claims the priority benefit of French patent application No 1458282 filed on Sep. 4, 2014 and of French patent application No 1463084 filed on Dec. 22, 2014, the whole contents of these applications being incorporated herein by reference for all purposes.

TECHNICAL FIELD

The invention relates to a method for the prophylactic treatment of the development of parasites in a food product storage silo, and in particular a cereal storage silo.

The present invention also relates to a method for the storage of food products, and in particular of cereals, using such a method.

PRIOR ART

The preservation and storage, after harvesting, of food products is an age old problem that has arisen since the dawn of time and the emergence of agriculture.

For example, today, the worldwide production of cereals is about 2500 million metric tons and requirements are increasing by about 2% to 3% per year (source: FAO, 2013). Climatic conditions can cause regional variations in production from one year to another of about 30%. It is therefore essential to be able not only to store food products and cereals between two successive harvests, but also to store them and to preserve them over longer periods in order to constitute safety stocks and to regionally avoid famines. The amount of worldwide cereal reserve stocks is currently estimated at 500 million metric tons.

Modern practices of food product storage in silos generally comprise: meticulous cleaning of the silos and of the handling circuits before filling; optionally followed by treatment of the silos by spraying or thermonebulization of an approved liquid or gaseous parasiticide; then filling of the silos with food products or cereals at a controlled degree of humidity; then control and regulation of the humidity and of the temperature of the products during storage. The walls of storage silos are generally made of wood (consisting of planks) with a steel structure (silos of small or average size with a capacity of a few tens of metric tons), or of steel (shells of interior silos of cereal ships, silos made of sheet steel), or of concrete (large silos with a capacity of several thousand metric tons). Silos made of steel are less preferred than those made of wood or concrete when they are placed in the open air, in particular because of the presence of cold spots causing condensation of water inside the silos during changes in temperature outside the silos.

Silo access to insects and parasites outside the silos is generally limited or controlled by filtration systems and sealed traps, placed for example upstream of the silo ventilation equipment and of the loading systems.

It is known practice to combat parasites by means of neurotoxic and growth-inhibiting substances such as pyrethroids, organohalogenated compounds (such as organofluorinated, organochlorinated or organobrominated compounds), organophosphorus compounds, and carbamates, or by means of cytotoxic substances such as aluminium phosphides or zinc phosphides. Currently, in many countries, only a small number of active substances are authorized against stored-product insects. These products are applied either by spraying or by thermonebulization. These substances have the risk of also being toxic to humans or animals when the food products are treated with such substances.

It is also known that parasiticidal compositions such as those based on natural or synthetic pyrethroids, or on organophosphorus compounds used as alternatives to organohalogenated compounds, have an effectiveness that decreases over time. These parasiticidal compositions have an action that can be described as "shock action". They are generally effective for about a few months. This is due to non-zero vapour pressures of the components that give rise to their volatilization over time and moreover to their degradation by oxidation.

The food products are generally treated with a parasiticidal substance before their storage in silos. The products are then controlled in order to guarantee a residual parasiticide threshold below the Maximum Residue Limits (MRLs) and the contractual limits. These MRLs are regulated values. The MRLs are regularly lowered in order to reduce the risks in consuming food products associated with such parasiticides. Reducing MRLs generally poses problems for long-term storage, in particular storage for more than one month, or for more than 3 months. For oilseeds (rapeseed, sunflower, peanut, etc), only treatments by fumigation (for example with aluminium phosphide) are authorized, and the MRLs are up to 100 times lower than on cereals; the MRLs are then generally at the level of the limit of detection.

Thus, an insecticidal treatment of empty premises that are to receive oil plants can cause a batch to be declassified solely through contact of the grain with the walls, this being all the truer if the silo is small.

US 2006/0040031 discloses acaricidal and insecticidal effects of a powder comprising sodium bicarbonate in the storage of cereals.

WO 2013/092694 discloses a method for manufacturing a parasiticidal composition comprising alkali metal bicarbonate and silica.

WO 98/38867 discloses a method for protecting surfaces from arthropode infestation. It is taught that the effects of the particle treatment protect the surface by creating a hostile environment on the surface that repels arthropode pests.

JP 19930102849 describes insecticidal particles having a size smaller than the hair distance of insect pests.

WO 2012/085218 and WO 2014/001417 disclose a fungicidal and parasiticidal fire-retardant powder comprising alkaline bicarbonate and silica.

It is therefore important to provide improved methods for treatment against the development of parasites in the storage of food products which make it possible to reduce the amounts used and/or the residual content of pesticides listed above, capable of having effects harmful to human or animal health, or even to completely eliminate the treatment of food products with such substances when it is a question of the production of food products for example of "organic" quality, or for example of the quality "without insecticide treatment" while enabling preservation thereof over long periods of time.

SUMMARY OF THE INVENTION

The inventors of the present invention have noted that mineral products in the form of fine particles applied as even a very thin layer to cover food-product scraps and/or dust which are present on the walls of silos make it possible to produce a barrier screen between parasite pests of food products and their food. The term "barrier screen between parasites and their food" is intended to mean in the present invention that the layer of mineral products in the form of fine particles does not allow the parasites access to their food. This food may be either the food product itself (in particular in the form of scrap or dust) or moulds of the food products (developing on the food product), acting as food for example for mycophagous parasites, insects or acarids.

Depending on the minerals, in addition to the physical barrier screen that they form between parasite and food, an additional effect can in particular come to be added by raising the content of salts partially soluble in the food, such as salts comprising alkali metals (such as sodium or potassium), sulphates, bicarbonates or carbonates which make the food unsuitable for consumption by the parasite. For example, the presence of alkali metals in the food of the parasite increases the osmotic pressure in the internal fluids of the parasite, and said parasite self-limits the consumption of food which is too salty. The presence of sulphate in a high content is laxative for the parasite. The minerals comprising a bicarbonate, a carbonate, or an oxide of an alkaline-earth metal are pH regulators. It has been observed that the parasite self-limits the consumption of such a food.

Thus, the minerals used in the present invention make the food of the parasite inaccessible and/or unattractive, without being parasite-repellent. Hence the prophylactic effect for the purposes of the present invention.

These minerals in the form of particles thus make it possible to prevent these parasites from colonizing the storage sites between two storage campaigns, in particular before the entry of the food products into the silos.

Furthermore, these minerals and formulations thereof block the cavities of the walls, and partially or totally cover their surface rough patches, where grains and dust attractive to the parasites are housed.

Consequently, the present invention relates to the use of a layer of mineral on the wall of a food product storage silo, wherein food product scraps and/or dust are attached to the walls of the silo after emptying of the silo, for producing a barrier between parasites and the food product scraps and/or dust, characterised in that
  the mineral is chosen from: an alkali metal bicarbonate, an alkali metal or alkaline-earth metal carbonate, an alkali metal or alkaline-earth metal sulphate, an alkaline-earth metal oxide, and mixtures thereof,
  the mineral being in the form of particles having an average diameter of at most 200 µm, and
  the layer comprising at least 10 g of the mineral per $m^2$ of wall.

A first advantage of the present invention lies in the very small amount of mineral to be used relative to the weight of stored food products.

A second advantage of the invention is that the minerals chosen in the present invention can be easily selected from the food-quality additives for humans or animals according to the FAO.

A third advantage of the invention is that of being able to improve the surface finishes of silo walls by filling all or some of the rough patches and interstices of such surfaces, with a view to reducing the parasite- and insect-pest food stores from the food products in the silos before a further storage campaign.

A fourth advantage of the invention is that of being able to reduce the amount of pesticide of pyrethroid, organohalogenated, organophosphorus or carbamate type during food product storage, by making it possible to avoid the use of such pesticides by pretreatment of the silo before storage, or even to reduce the amount used.

A fifth advantage of the invention lies in the possibility of combining such a method with the techniques of treatment by gradual cooling of the food products stored in silos to a temperature below 10° C., in order to preserve the food products, for example of "organic" quality, or the oil plants, without pretreatment of the silo and/or without pretreatment of the food products with pesticides of pyrethroid or organophosphorus type.

Definitions

In the present invention, in the present descriptive specification, some terms are intended to have the following meanings.

The term "parasites" is intended to mean arthropods such as insects or acarids which develop in food products, and in particular those which develop in cereals.

The term "prophylactic treatment method" is intended to mean a method which makes it possible to prevent the development of parasites in food products.

The term "food products" is intended to mean grains or beans of plants used mainly in feeding humans and animals, in the form of whole grains or milled grains (flours), such as the grains or beans of:
  Cereals: of the family Poaceae (wheat, rice, maize, sorghum, etc.), namely cereals in the strict sense;
  "pseudocereals": namely grains of the family Polygonaceae (buckwheat, etc.), Chenopodiaceae (*quinoa, amaranth*, etc.), Pedaliaceae (sesame, etc.);
  oil plants (rapeseed, sunflower, peanut, etc.);
  horse beans, French beans, lentils and peas, in particular of the family Fabaceae.

The term "food product storage silo" is intended to mean a reservoir intended for preserving food products.

The term "food product storage" is intended to mean the act of forming a store of food products, comprising all or some of the following operations: filling, preserving, and emptying of the food product store.

The term "food product scraps and/or dust" is intended to mean the pieces and debris of food product grains generated by the storage operations, such as: filling, preserving, or emptying.

The term "mineral" is intended to mean an essentially inorganic compound, generally containing less than 20%, preferably less than 5%, or more preferably less than 1% by weight of organic matter.

The term "layer of mineral in the form of particles" is intended to mean the more or less uniform dispersion of the mineral on the food product scraps and/or dust.

The term "trona" is intended to mean a mineral containing at least 60%, preferably at least 80%, more preferably at least 90%, even more preferably at least 95% by weight of sodium sesquicarbonate ($NaHCO_3.N2CO_3.2H_2O$). The remainder of the mineral generally consists of clays, or carbonate of calcium or magnesium. The term "wall of a silo" is intended to mean the internal and/or external surface of the silo.

The term average diameter is intended to mean the weight-average diameter of particles measured by laser diffraction and scattering on a Malvern Mastersizer S particle size analyser using an He—Ne laser source having a wavelength of 632.8 nm and a diameter of 18 mm, a measurement cell equipped with a backscatter 300 mm lens (300 RF), and an MS 17 liquid preparation unit, using ethanol saturated with bicarbonate at ambient temperature (22° C.).

The term "co-formulant" is intended to mean a compound of the type co-formulant or of the type gelling agent. The term "co-formulant" is also intended to mean a compound which facilitates the flow of the mineral in particulate form, in particular the compounds which, mixed with the mineral, reduce its angle of repose as measured by ISO standard 3435-1977.

The term "gelling agent" is intended to mean a compound that allows to increase the viscosity of an aqueous suspension of 35% by weight of mineral based on the solution, measured on a Brookfield viscometer equipped with a mobile S63 rotating at 60 revolutions per minute.

In the present specification, the choice of an element from a group of elements also explicitly describes:
the choice of two or the choice of several elements from the group,
the choice of an element from a subgroup of elements consisting of the group of elements from which one or more elements have been removed.

In addition, it should be understood that the elements and/or the characteristics of a process or a use, described in the present specification, can be combined in all ways possible with the other elements and/or characteristics of the process, or of use, explicitly or implicitly, this being without departing from the context of the present specification.

In the passages of the present specification that will follow, various embodiments or items of implementation are defined in greater detail. Each embodiment or item of implementation thus defined can be combined with another embodiment or with another item of implementation, this being for each mode or item unless otherwise indicated or clearly incompatible when the range of the same parameter of value is not connected. In particular, any variant indicated as being preferred or advantageous can be combined with another variant or with the other variants indicated as being preferred or advantageous.

In the present specification, the description of a range of values for a variable, defined by a bottom limit, or a top limit, or by a bottom limit and a top limit, also comprises the embodiments in which the variable is chosen, respectively, within the value range: excluding the bottom limit, or excluding the top limit, or excluding the bottom limit and the top limit.

In the present specification, the description of several successive ranges of values for the same variable also comprises the description of embodiments where the variable is chosen in any other intermediate range included in the successive ranges. Thus, for example, when it is indicated that "the magnitude X is generally at least 10, advantageously at least 15", the present description also describes the embodiment where: "the magnitude X is at least 11", or also the embodiment where: "the magnitude X is at least 13.74", etc.; 11 or 13.74 being values included between 10 and 15.

The term "comprising" includes "consisting essentially of" and also "consisting of".

In the present specification, the use of "a" in the singular also comprises the plural ("some"), and vice versa, unless the context clearly indicates the contrary. By way of example, "a mineral" denotes one mineral or more than one mineral.

If the term "approximately" is used before a quantitative value, this corresponds to a variation of ±10% of the nominal quantitative value, unless otherwise indicated.

DETAILED DESCRIPTION OF THE INVENTION

The present invention thus relates to:
a method for the prophylactic treatment of the development of parasites in a food product storage silo, and
a use of a layer of mineral for producing a barrier between parasites and their food,
as described hereinafter Item 1. Method for the prophylactic treatment of the development of parasites in a food product storage silo, the silo comprising walls, and the food product storage generating the deposit of food product scraps and/or dust on the walls of the silo after emptying of the silo,
said prophylactic treatment method comprising the application to at least one part of the walls:
of a mineral chosen from: an alkali metal bicarbonate, an alkali metal or alkaline-earth metal carbonate, an alkali metal or alkaline-earth metal sulphate, an alkaline-earth metal oxide, and mixtures thereof,
the mineral being in the form of particles having an average diameter of at most 200 µm,
the mineral being applied as a layer comprising at least 10 g of the mineral per $m^2$ of wall, and
said method being characterized in that the application of the layer is carried out, after emptying of the silo, on food product scraps and/or dust deposited on the walls of the silo.

Item 2. Method according to item 1, according to which the mineral is chosen from: sodium bicarbonate, potassium bicarbonate, trona, sodium carbonate, potassium carbonate, calcium carbonate, magnesium carbonate, dolomite, sodium sulphate, potassium sulphate, calcium sulphate, magnesium sulphate, magnesium oxide, or mixtures thereof.

Item 3. Method according to item 2, according to which the mineral is sodium bicarbonate or trona.

Item 4. Method according to any one of items 1 to 3, according to which a co-formulant of the mineral, chosen from: a silica, a diatomaceous earth, an alkaline-earth metal silicate, a clay, a montmorillonite, a zeolite, or mixtures thereof, is applied to the walls with said mineral.

Item 5. Method according to item 4, according to which the co-formulant of the mineral is chosen from: calcium stearate, magnesium stearate, precipitated silica, fumed silica, silica gel, sodium silicate, potassium silicate, anhydrous magnesium silicate, magnesium silicate hydrate, iron silicates, kaolin, bentonite, smectite, montmorillonite, perlite, diatomaceous earth, pyrophyllite, attapulgite, vermiculite, sepiolite, expanded perlite, and mixtures thereof.

Item 6. Method according to any one of items 1 to 5, according to which the mineral, and the co-formulant of the mineral if present, is (are) in the form of particles, such that at least 50% by weight of the particles have a diameter of less: than 100 µm, preferably than 70 µm, more preferably than 40 µm, even more preferably than 30 µm, also preferably such that at least 90% by weight of the particles have a diameter of less: than 100 µm, preferably than 70 µm, more preferably than 40 µm, even more preferably than 30 µm.

Item 7. Method according to item 4, according to which the mineral comprises one or more mineral(s) soluble at ambient temperature in water at a concentration of at least 50 g for 1000 g of water, and the co-formulant of the mineral is sparingly soluble in water, namely soluble at ambient temperature at a concentration of at most 10 g for 1000 g of water.

Item 8. Method according to item 7, according to which the mineral comprises sodium bicarbonate and the co-formulant of the mineral is silica.

Item 9. Method according to any one of items 1 to 8, according to which the mineral comprises at least 60%, advantageously at least 70%, more advantageously at least 80%, even more advantageously at least 85% by weight of sodium bicarbonate. In the present invention, the mineral may also consist essentially of sodium bicarbonate.

Item 10. Method according to any one of items 4 to 9, according to which a co-formulant of the mineral is applied with the mineral and is in a proportion by weight of at most 20% or of at most 15% relative to the mineral.

Item 11. Method according to any one of items 1 to 9, according to which the mineral, and the co-formulant of the mineral if present, is (are) free of neurotoxic pesticide. In particular, the mineral, and the co-formulant of the mineral if present, contain(s) neither pyrethrum nor synthetic pyrethroids, such as permethrin.

Item 12. Method according to any one of items 1 to 11, according to which the mineral, and the co-formulant of the mineral if present, is (or are) applied as a layer by powdering.

Item 13. Method according to any one of items 1 to 11, according to which the application of the mineral to the walls is carried out by sprinkling, brushing or spraying the mineral in the form of aqueous suspension of the mineral, then drying.

Item 14. Method according to item 13, according to which the application is carried out by spraying the mineral in the form of an aqueous suspension of the mineral in the form of droplets, and such that at least 70% by weight of the droplets have a size of less than 500 µm.

Item 15. Method according to any one of items 1 to 14, according to which the layer comprising the mineral is an adhesive layer, characterized in that the layer applied to a sheet of galvanized metal of 0.01 $m^2$ placed horizontally, the layer being applied to the upper face, retains, after the sheet of galvanized metal has been turned over and placed with the coated face facing the ground, at least 80% of the mineral after one hour, advantageously after one week, more advantageously after 60 days.

Item 16. Method according to any one of items 1 to 15, according to which the layer comprising the mineral is a pulverulent layer, characterized in that such a layer applied to a horizontal sheet of galvanized metal of 0.01 $m^2$, then subjected, at a distance of 60 cm, for 10 minutes, to a jet of air of 2 bar having an initial air speed of 14 m/s, loses at least 20% of the mineral.

Item 17. Method according to any one of items 1 to 16, according to which the layer comprises at most 200 g, preferably at most 100 g, more preferably at most 40 g of mineral per square metre of wall.

Item 18. Method according to any one of items 1 to 17, according to which the layer is applied to the walls of the silo in order to fill at least one part of the crevices of the walls.

Item 19. Method according to any one of items 1 to 18, according to which the application is carried out from February to June in the northern hemisphere (or August to December in the southern hemisphere) on the walls of the empty food product storage silo.

Item 20. Method according to any one of items 1 to 19, according to which the amount of mineral used for the prophylactic treatment is at most 100, advantageously at most 50, more advantageously at most 30 g of mineral per metric ton of storable or stored food products.

Item 21. Method for storing food products in a silo, according to which a prophylactic treatment method according to any one of items 1 to 20 is applied to the silo, then the silo is filled with food products pretreated with a pesticide before storage of the food products in the silo.

Item 22. Method for storing food products in a silo, according to which a prophylactic treatment method according to any one of items 1 to 20 is applied to the silo, then the silo is filled with food products not pretreated with a neurotoxic pesticide before storage of the food products in the silo.

Item 23. Method for storing food products in a silo according to item 22, according to which the silo is filled with food products not pretreated with a pesticide before storage of the food products in the silo.

Item 24. Method for storing food products according to any one of items 21 to 23, according to which, after the application of the mineral to the silo, the silo is filled with food products, and the food products are subject to one or more cooling steps in order to lower their temperatures to at most 10° C.

Item 25. Method for storing food products according to item 24, according to which the cooling in order to lower the temperature of the food products to at most 10° C. is carried out by ventilation with cool air, in particular with cool air having a temperature at most 8 to 10° C. lower than the temperature of the food products.

Item 26. Use of a mineral chosen from: an alkali metal bicarbonate, and alkali metal carbonate, an alkaline-earth metal carbonate, an alkali metal sulphate, an alkaline-earth metal sulphate, an alkaline-earth metal oxide, and mixtures thereof, the mineral being in the form of particles having an average diameter of at most 200 µm, for the prophylactic treatment of the development parasites in a food product storage silo, the silo comprising walls and food product scraps and/or dust attached to the walls, said prophylactic treatment consisting of the application of the mineral to said food product scraps and/or dust attached to the walls, as a layer comprising at least 10 g of the mineral per $m^2$ of wall.

Item 27. Use of a mineral according to item 26, making it possible to limit parasite access to the food product scraps or dust and to prevent the parasites from feeding thereon.

Item 28. Use of a layer of mineral on the wall of a food product storage silo, wherein food product scraps and/or dust are attached to the walls of the silo after emptying of the silo, for producing a barrier between parasites and the food product scraps and/or dust, characterised in that the mineral is chosen from: an alkali metal bicarbonate, an alkali metal or alkaline-earth metal carbonate, an alkali metal or alkaline-earth metal sulphate, an alkaline-earth metal oxide, and mixtures thereof, the mineral being in the form of particles having an average diameter of at most 200 µm, and the layer comprising at least 10 g of the mineral per $m^2$ of wall.

Item 29. Use according to item 28, according to which the mineral is chosen from: sodium bicarbonate, potassium bicarbonate, trona, sodium carbonate, potassium carbonate, calcium carbonate, magnesium carbonate, dolomite, sodium sulphate, potassium sulphate, calcium sulphate, magnesium sulphate, magnesium oxide, or mixtures thereof.

Item 30. Use according to item 29, according to which the mineral is sodium bicarbonate or trona.

Item 31. Use according to any one of items 28 to 30, according to which the layer additionally comprises a co-formulant of the mineral, the co-formulant being selected from: a silica, a diatomaceous earth, an alkaline-earth metal silicate, a clay, a montmorillonite, a zeolite, and mixtures thereof.

Item 32. Use according to any one of items 28 to 31, according to which the layer is obtained by application of the mineral to the walls by sprinkling, brushing or spraying the mineral in the form of an aqueous suspension of the mineral, then drying.

Item 33. Use according to any one of items 28 to 32, according to which the layer comprising the mineral is an adhesive layer, characterized in that the layer applied to a sheet of galvanized metal of 0.01 m$^2$ placed horizontally, the layer being applied to the upper face, retains, after the sheet of galvanized metal has been turned over and placed with the coated face facing the ground, at least 80% of the mineral after one hour, advantageously after one week, more advantageously after 60 days.

Item 34. Use according to any one of items 28 to 32, according to which the layer comprising the mineral is a pulverulent layer, characterized in that such a layer applied to a horizontal sheet of galvanized metal of 0.01 m$^2$, then subjected, at a distance of 60 cm, for 10 minutes, to a jet of air of 2 bar having an initial air speed of 14 m/s, loses at least 20% of the mineral.

Item 35. Use according to any one of items 28 to 34, according to which the layer comprises at most 200 g, preferably at most 100 g, more preferably at most 40 g of mineral per square metre of wall.

Item 36. Use according to any one of items 28 to 35, according to which the layer fills at least part of the crevices of the walls.

Item 37. Use according to any one of items 28 to 36, according to which the layer is applied from February to June in the northern hemisphere (or August to December in the southern hemisphere) on the walls of the empty food product storage silos.

Item 38. Use of the layer of mineral on the wall of a food product storage silo, wherein food product scraps and/or dust are attached to the walls of the silo after emptying of the silo, for preventing an increase in population of parasites in the food product storage silo without significantly increasing, preferably without increasing the mortality of the parasites compared to their mortality in the absence of food, characterised in that the mineral is chosen from: an alkali metal bicarbonate, an alkali metal or alkaline-earth metal carbonate, an alkali metal or alkaline-earth metal sulphate, an alkaline-earth metal oxide, and mixtures thereof, the mineral being in the form of particles having an average diameter of at most 200 µm, and the layer comprising at least 10 g of the mineral per m$^2$ of wall.

Item 39. Method for preventing an increase in population of parasites in a food product storage silo without significantly increasing, preferably without increasing the mortality of the parasites compared to their mortality in the absence of food, the silo comprising walls, and the food product storage generating deposit of food product scraps and/or dust on the walls of the silo after emptying of the silo, said method comprising the application to at least part of the walls of a mineral chosen from: an alkali metal bicarbonate, an alkali metal or alkaline-earth metal carbonate, an alkali metal or alkaline-earth metal sulphate, an alkaline-earth metal oxide, and mixtures thereof, the mineral being in the form of particles having an average diameter of at most 200 µm, the mineral being applied as a layer comprising at least 10 g of the mineral per m$^2$ of wall, and said method being characterized in that the application of the layer is carried out after emptying of the silo, on food product scraps and/or dust deposited on the walls of the silo.

Item 40. The use or method according to any of the preceding claims which is non-parasiticidal.

Item 41. The use or method according to any of the preceding claims which is without being parasite-repellent.

Item 42. The use or method according to any one of items 28 to 41, according to which the mineral, and the co-formulant of the mineral if present, is (are) in the form of particles, such that at least 50% by weight of the particles have a diameter of less: than 100 µm, preferably than 70 µm, more preferably than 40 µm, even more preferably than 30 µm, also preferably such that at least 90% by weight of the particles have a diameter of less: than 100 µm, preferably than 70 µm, more preferably than 40 µm, even more preferably than 30 µm.

In the present invention, the minerals are either natural, or produced synthetically.

In one preferred mode of the present invention, the mineral and/or the co-formulant of the mineral are food additives. The term "food additive" is intended to mean the compounds listed in and corresponding to the Codex Alimentarius of the FAO/WHO—version 2013.

Furthermore, the minerals or the co-formulants of minerals listed in the present specification, in particular those listed in items 2 to 5, are usable in organic agriculture according to EC regulation 834/2007.

Among the minerals listed in items 1 to 3, sodium bicarbonate is particularly advantageous since, in addition to being authorized by various organizations (such as the FDA in the United States) in human or animal food, it is has very favourable toxicological and eco-toxicological profiles and is well tolerated by all living organisms such as humans and mammals. For example, the plasma and blood of human beings naturally contains it at a concentration of about 1200 mg/l, and it holds an important pH-regulating role for these fluids.

The co-formulants of items 4 to 6 may be in amorphous or crystalline form. However, it is preferred for them to be in amorphous form, that is to say in non-crystalline form. This is particularly the case for co-formulants containing silica. In this respect, non-crystalline precipitated silicas or non-crystalline fumed silicas are particularly recommended in the present invention.

The examples that follow are intended for illustrating the invention. They should not be interpreted as limiting the scope of the invention claimed.

EXAMPLES

Example 1

In this example, the effectiveness of a barrier layer of a mineral consisting of a sodium bicarbonate (Solvay Bicar® Food grade 0/4), with an average laser particle size of 25 µm, deposited at various thicknesses: respectively 17 and 34 g/m$^2$, was tested. In order to see the effectiveness of the barrier layer on the food uptake of insects, three insect populations were tested:

*Tribolium confusum,*

*Sitophilus granarius* (grain weevil),

*Ephestia kuehniella* (flour moth).

The food product chosen was of two types:

ground wheat (in order to simulate food product scraps), wheat flour (T55) (in order to simulate food product dust).

The food product tested was deposited on a galvanized iron plate, in an amount of 20 g/m² in order to simulate the food product scraps or dust on a silo wall after emptying.

The layer of mineral was deposited on the layer of milled wheat or on the layer of flour by spraying the mineral in aqueous suspension at 50% by weight, and was then dried in order to form the barrier layer of minimal either at 17 or at 34 g/m².

The insect populations were pre-starved for 10 days without being fed.

The three pre-starved insect populations were then fractionated and distributed onto various sheet metal plates:
- without milled wheat or flour (i.e. without food),
- with milled wheat or flour (i.e. with food) at 20 g/m² and 0 g/m² of mineral (i.e. without mineral layer),
- with milled wheat or flour (i.e. with food) at 20 g/m² and 17 g/m² of mineral,
- with milled wheat or flour (i.e. with food) at 20 g/m² and 34 g/m² of mineral (i.e. a mineral layer twice as great as the one at 17 g/m²).

The mortality rate expressed as percent of each insect population was monitored over the course of 10 days (after the 10 days where the insects were pre-starved). The sheet metal plates covered with food allowed the insect populations to have something to eat and to feed themselves suitably over the course of the 10 days of the test with maximum mortality rates observed after 10 days on the control populations of:

*Tribolium*: 1%

*Sitophilus*: 2%

*Ephestia*: 6%.

Table 1 hereinafter gives the mortality rate of the insect populations as a function of the number of days of exposure on the sheet metal plates:
- without food
- or with food (20 g/m²) and coated with 17 or 34 g/m² of layer of mineral.

It is observed that, in the presence of the layer of mineral on the layer of food (scraps or dust), the insects can virtually not feed: the mortality rate of the insects as a function of time is slightly less than or equal to the mortality rate of the control tests without accessible food. The mortality rate is 100% after 7 to 9 days with food and mineral layer (tests 4 to 15), while the mortality rate of 100% of the insects without food (tests 1 to 3) is reached after 7 days on the control tests This shows that the barrier layer of mineral has a very high effectiveness for preventing food-product insect pests from reaching scraps or flour located under the layer of mineral, and thus preventing development of said insect pests.

TABLE 1

Insect population mortality (%) vs. Number of days' exposure on control plates (no food) or on plates with food and mineral layer

| | | | Mineral layer g/m² | | Insect population mortality (%) vs. Number of days exposure | | | | | | | | | |
|---|---|---|---|---|---|---|---|---|---|---|---|---|---|---|
| Ref | Food | Test conditions | | Insects | 1 day | 2 days | 3 days | 4 days | 5 days | 6 days | 7 days | 8 days | 9 days | 10 days |
| 1 | No food | No food | 0 | *Tribolium* | 0 | 0 | 5 | 26 | 58 | 91 | 100 | 100 | 100 | 100 |
| 2 | No food | No food | 0 | *Sitophilus* | 0 | 0 | 1 | 5 | 46 | 79 | 100 | 100 | 100 | 100 |
| 3 | No food | No food | 0 | *Ephestia* | 0 | 0 | 2 | 7 | 62 | 94 | 100 | 100 | 100 | 100 |
| 4 | Milled wheat 20 g/m² | Food + Mineral layer | 17 | *Tribolium* | 0 | 0 | 2 | 17 | 41 | 79 | 96 | 100 | 100 | 100 |
| 5 | Milled wheat 20 g/m² | Food + Mineral layer | 17 | *Sitophilus* | 0 | 0 | 0 | 6 | 37 | 72 | 91 | 100 | 100 | 100 |
| 6 | Milled wheat 20 g/m² | Food + Mineral layer | 17 | *Ephestia* | 0 | 1 | 3 | 9 | 57 | 87 | 100 | 100 | 100 | 100 |
| 7 | Milled wheat 20 g/m² | Food + Mineral layer | 34 | *Tribolium* | 0 | 0 | 3 | 21 | 60 | 84 | 100 | 100 | 100 | 100 |
| 8 | Milled wheat 20 g/m² | Food + Mineral layer | 34 | *Sitophilus* | 0 | 1 | 3 | 6 | 41 | 76 | 95 | 100 | 100 | 100 |
| 9 | Milled wheat 20 g/m² | Food + Mineral layer | 34 | *Ephestia* | 0 | 1 | 4 | 10 | 56 | 88 | 100 | 100 | 100 | 100 |
| 10 | Milled Flour 20 g/m² | Food + Mineral layer | 17 | *Tribolium* | 0 | 0 | 3 | 9 | 34 | 55 | 82 | 100 | 100 | 100 |
| 11 | Milled Flour 20 g/m² | Food + Mineral layer | 17 | *Sitophilus* | 0 | 1 | 3 | 7 | 23 | 57 | 76 | 91 | 100 | 100 |
| 12 | Milled Flour 20 g/m² | Food + Mineral layer | 17 | *Ephestia* | 0 | 0 | 2 | 6 | 40 | 67 | 85 | 100 | 100 | 100 |
| 13 | Milled Flour 20 g/m² | Food + Mineral layer | 34 | *Tribolium* | 0 | 1 | 2 | 11 | 39 | 60 | 87 | 100 | 100 | 100 |
| 14 | Milled Flour 20 g/m² | Food + Mineral layer | 34 | *Sitophilus* | 0 | 2 | 2 | 5 | 28 | 61 | 82 | 98 | 100 | 100 |
| 15 | Milled Flour 20 g/m² | Food + Mineral layer | 34 | *Ephestia* | 0 | 1 | 3 | 8 | 51 | 76 | 92 | 100 | 100 | 100 |

Example 2

In this example, use was made, as mineral, of a sodium bicarbonate (Solvay Bicar® Food grade 0/4), with an average laser particle size of 25 μm, and a co-formulant of the mineral composed of amorphous silica (Solvay Tixosil® 38 AB Food grade), with an average laser particle size of 25 μm (weight-average diameter). The mineral and co-formulant are both of food grade.

The weight-average diameter is measured by laser diffraction and scattering on a Malvern Mastersizer S particle size analyser using an He—Ne laser source having a wavelength of 632.8 nm and a diameter of 18 mm, a measurement cell equipped with a backscatter 300 mm lens (300 RF), and an MS 17 liquid preparation unit, using ethanol saturated with bicarbonate at ambient temperature (22° C.).

The mineral and the co-formulant of the mineral were introduced into a Lödige ploughshare powder mixer and the powder was mixed for 5 minutes so as to obtain a homogeneous powder. A suspension of the mineral and of the co-formulant of the mineral was then prepared by pouring 10 kg of the powder obtained (85% sodium bicarbonate and 15% silica) into 10 litres of water while dispersing the mineral and co-formulant with a shearing agitator, and a homogeneous suspension containing 50% by weight of mineral and of co-formulant was obtained.

The aqueous suspension of mineral and of fluidizer was applied by spraying by means of a piston pump at a pressure of 40 bar and at a flow rate of 3 litres per minute, onto the walls of a concrete cereal storage silo freshly emptied in February, on a layer of 20 g of the mineral and co-formulant assembly, per m² of wall. The concrete walls before treatment were clean but partially covered with small scraps and dust from wheat grains. The aqueous suspension adhered to the cereal scraps and dust to form a layer of mineral and co-formulant on the cereal scraps and dust.

A concrete silo juxtaposed with respect to the treated silo, having the same size and made of the same concrete, and emptied in February, of the same wheat harvest, was not treated according to the present method in order to produce a control.

In July, the two silos: the treated one and the non-treated control silo, were filled with the same harvest of non-treated wheat grains of organic grade.

From July to October, the silos were cooled by injection of cold air overnight in order to gradually lower the temperature of the grain to 8+/−1° C.

Example 3

In this example, the effectiveness of barrier layers of different minerals was tested. It was also tested whether these barrier layers exhibit any parasiticidal effect. As minerals trona, sodium carbonate, magnesium carbonate, magnesium oxide and sodium sulphate were tested. All minerals had an average particle diameter of below 70 μm. All tested mineral powders contained w/w of amorphous silica. The minerals were applied as an aqueous slurry containing 50% w/w of mineral formulation. The barrier layers were prepared by spraying the aqueous slurry on a metal plate at a dose of 18 g dry solid/m² and drying the thus obtained layer.

Experiments were conducted under four different test conditions. Under condition 1, the insects were placed on the metal plate without any food and without any mineral layer. Under condition 2, A and B first a mix of crushed wheat and flour (T55) was deposited on the metal plate at a dose of 20 g/m². Under condition 2, the insects were placed on the food layer without any mineral layer. Under condition A, the mineral layer was sprayed onto the food layer and after drying, insects and available food in a petri dish were placed on the dry mineral layer. Under condition B, the mineral layer was sprayed onto the food layer and after drying, the insects were placed on the dry mineral layer without any additional food.

Three insect populations were tested:
*Tribolium confusum* (TC)
*Sitophilus oryzae* (SO)
*Ephestia kuehniella* (EK).

All insects were pre-starved for 10 days without being fed before testing. The mortality rate expressed as percent of each insect population was monitored over the course of 10 days (after the 10 days where the insects were pre-starved).

Table 2 hereinafter gives the mortality rate of the insect populations as function of the number of days of exposure on the metal plates.

TABLE 2

| Condition | Food (on metal plate) | Mineral layer) | Available food (in Petri dish) | Insects | 0.5 day | 1 day | 2 days | 3 days | 4 days | 5 days | 6 days | 7 days | 8 days | 9 days | 10 days |
|---|---|---|---|---|---|---|---|---|---|---|---|---|---|---|---|
| 1 | No food (on metal plate) | No treatment | No food | TC | 0 | 2 | 3 | 8 | 11 | 31 | 86 | 100 | 100 | 100 | 100 |
| | | | | SO | 0 | 0 | 1 | 8 | 15 | 76 | 100 | 100 | 100 | 100 | 100 |
| | | | | EK | 0 | 4 | 8 | 13 | 16 | 84 | 100 | 100 | 100 | 100 | 100 |
| 2 | Crushed wheat & flour (20 g/m²) | No treatment | No food | TC | 0 | 0 | 1 | 3 | 3 | 5 | 11 | 12 | 12 | 12 | 12 |
| | | | | SO | 0 | 0 | 0 | 0 | 0 | 2 | 4 | 4 | 4 | 5 | 5 |
| | | | | EK | 0 | 1 | 1 | 3 | 5 | 7 | 9 | 12 | 15 | 16 | 16 |
| 3A | Crushed wheat & flour (20 g/m²) | Trona | Available food (in a petri dish) on mineral layer | TC | 0 | 2 | 2 | 4 | 6 | 9 | 13 | 13 | 15 | 15 | 15 |
| | | | | SO | 0 | 0 | 2 | 4 | 4 | 4 | 5 | 7 | 7 | 8 | 9 |
| | | | | EK | 0 | 0 | 2 | 3 | 7 | 11 | 12 | 12 | 14 | 14 | 14 |
| 3B | Crushed wheat & flour (20 g/m²) | Trona | No food | TC | 0 | 0 | 2 | 5 | 8 | 23 | 40 | 65 | 82 | 100 | 100 |
| | | | | SO | 0 | 0 | 2 | 7 | 18 | 34 | 64 | 76 | 93 | 100 | 100 |
| | | | | EK | 0 | 1 | 3 | 7 | 9 | 72 | 87 | 90 | 100 | 100 | 100 |
| 4A | Crushed wheat & flour (20 g/m²) | Sodium Carbonate | Available food (in a petri dish) on mineral layer | TC | 0 | 0 | 0 | 1 | 2 | 2 | 5 | 7 | 9 | 10 | 10 |
| | | | | SO | 0 | 1 | 1 | 1 | 2 | 3 | 4 | 4 | 6 | 6 | 6 |
| | | | | EK | 0 | 0 | 1 | 2 | 3 | 6 | 6 | 10 | 11 | 11 | 13 |
| 4B | Crushed wheat & flour (20 g/m²) | Sodium Carbonate | No food | TC | 0 | 1 | 2 | 5 | 8 | 20 | 67 | 83 | 92 | 100 | 100 |
| | | | | SO | 0 | 0 | 1 | 7 | 11 | 71 | 96 | 100 | 100 | 100 | 100 |
| | | | | EK | 0 | 1 | 3 | 8 | 12 | 78 | 93 | 100 | 100 | 100 | 100 |
| 5A | Crushed wheat & flour (20 g/m²) | Magnesium carbonate | Available food (in a petri dish) on mineral layer | TC | 0 | 1 | 1 | 3 | 5 | 7 | 10 | 10 | 11 | 11 | 11 |
| | | | | SO | 0 | 0 | 0 | 1 | 2 | 2 | 2 | 4 | 5 | 6 | 6 |
| | | | | EK | 0 | 0 | 0 | 1 | 3 | 5 | 9 | 10 | 10 | 10 | 12 |
| 5B | Crushed wheat & flour (20 g/m²) | Magnesium carbonate | No food | TC | 0 | 0 | 2 | 3 | 9 | 17 | 45 | 71 | 88 | 100 | 100 |
| | | | | SO | 0 | 0 | 0 | 5 | 11 | 24 | 56 | 73 | 94 | 100 | 100 |
| | | | | EK | 0 | 0 | 1 | 3 | 5 | 64 | 81 | 92 | 100 | 100 | 100 |
| 6A | Crushed wheat & flour (20 g/m²) | Magnesium oxide | Available food (in a petri dish) on mineral layer | TC | 0 | 0 | 1 | 3 | 5 | 8 | 8 | 9 | 10 | 10 | 11 |
| | | | | SO | 0 | 0 | 0 | 1 | 2 | 3 | 5 | 5 | 5 | 6 | 7 |
| | | | | EK | 0 | 0 | 1 | 1 | 2 | 4 | 5 | 7 | 9 | 11 | 11 |
| 6B | Crushed wheat & flour (20 g/m²) | Magnesium oxide | No food | TC | 0 | 0 | 2 | 6 | 9 | 11 | 19 | 38 | 47 | 56 | 69 |
| | | | | SO | 0 | 0 | 1 | 1 | 2 | 6 | 15 | 49 | 72 | 91 | 100 |
| | | | | EK | 0 | 1 | 2 | 4 | 7 | 16 | 30 | 43 | 56 | 70 | 82 |
| 7A | Crushed wheat & flour (20 g/m²) | Sodium sulphate | Available food (in a petri dish) on mineral layer | TC | 0 | 1 | 1 | 2 | 4 | 4 | 6 | 6 | 8 | 8 | 9 |
| | | | | SO | 0 | 0 | 2 | 3 | 3 | 3 | 3 | 3 | 3 | 5 | 6 |
| | | | | EK | 0 | 0 | 0 | 1 | 2 | 5 | 6 | 8 | 8 | 9 | 10 |

TABLE 2-continued

| Condition | Food (on metal plate) | Mineral layer | Available food (in Petri dish) | Insects | 0.5 day | 1 day | 2 days | 3 days | 4 days | 5 days | 6 days | 7 days | 8 days | 9 days | 10 days |
|---|---|---|---|---|---|---|---|---|---|---|---|---|---|---|---|
| 7B | Crushed wheat & flour (20 g/m²) | Sodium sulphate | No food | TC | 0 | 0 | 0 | 2 | 7 | 13 | 19 | 31 | 49 | 71 | 83 |
| | | | | SO | 0 | 0 | 2 | 2 | 3 | 14 | 18 | 39 | 55 | 73 | 85 |
| | | | | EK | 0 | 0 | 1 | 2 | 5 | 12 | 24 | 49 | 62 | 91 | 100 |

From the data in Table 2, it is evident that the mortality rate of insects on a metal plate without access to any food significantly increases after about 5 days (condition 1). In the presence of food, but without any mineral layer (condition 2) the mortality rate is rather low even after 10 days. If the layer of crushed wheat and flour on the metal plate is coated with a mineral layer of trona (condition 3B), sodium carbonate (condition 4B) or magnesium carbonate (condition 5B) and no other food is available to the insects, the mortality rate increases significantly after about 5 days and is similar to the one observed in the absence of any food. This demonstrates that the mineral forms an effective barrier layer between the crushed wheat and flour on the metal plate and the insects.

In case where magnesium oxide (condition 6B) or sodium sulphate (condition 7B) are used as barrier layer, the mortality rate of the insects significantly increases after about 7 days. This demonstrates that the barrier layer comprising magnesium oxide or sodium sulphate is slightly less pronounced compared to barrier layers comprising trona, sodium carbonate or magnesium carbonate. Nevertheless, also magnesium oxide and sodium sulphate are still suitable for forming the desired barrier layer.

Furthermore, if the insects are provided with food in a petri dish placed on the mineral layer (conditions 3A, 4A, 5A, 6A and 7A), their mortality rate is similar to the mortality rate in the absence of any mineral layer on the crushed wheat and flour (condition 2). This demonstrates that the mineral layer only prevents the insects from accessing their food without being harmful to the insects as such. If food is available to the insects, they survive on the mineral layer showing substantially the same mortality as without any mineral layer. Thus, the mineral layer is non-parasitical.

Example 4

Example 3 was repeated but using Bi-Ex® (97% w/w sodium bicarbonate+anti-caking agent; available from Solvay) and sodium bicarbonate (mixture of 95 w/w sodium bicarbonate and 5% w/w amorphous silica) as mineral. In both cases the average diameter of the mineral particles was below 70 µm. The results are summarized in Table 3 hereinafter.

TABLE 3

| Condition | Food (on metal plate) | Available food (in Petri dish) | Mineral layer (g/m2 dry product) on food located on metal plate | Insects | Exposition time (day) | | | | | | | | | |
|---|---|---|---|---|---|---|---|---|---|---|---|---|---|---|
| | | | | | 1 day | 2 days | 3 days | 4 days | 5 days | 6 days | 7 days | 8 days | 9 days | 10 days |
| 1 | No food (on metal plate) | / | No treatment | TC | 0 | 1 | 2 | 15 | 39 | 77 | 93 | 100 | 100 | 100 |
| | | | | SO | 0 | 0 | 4 | 8 | 58 | 100 | 100 | 100 | 100 | 100 |
| | | | | EK | 0 | 1 | 5 | 9 | 71 | 100 | 100 | 100 | 100 | 100 |
| 2 | Crushed wheat & flour (20 g/m²) | / | No treatment | TC | 0 | 0 | 2 | 3 | 6 | 6 | 9 | 9 | 11 | 13 |
| | | | | SO | 0 | 0 | 1 | 2 | 3 | 5 | 6 | 7 | 7 | 8 |
| | | | | EK | 0 | 0 | 2 | 2 | 3 | 5 | 9 | 11 | 12 | 15 |
| 3 | Crushed wheat & flour (20 g/m²) | / | Bi-Ex (30 g/m²) | TC | 0 | 1 | 3 | 8 | 31 | 55 | 79 | 93 | 100 | 100 |
| | | | | SO | 0 | 0 | 3 | 6 | 44 | 82 | 91 | 99 | 100 | 100 |
| | | | | EK | 1 | 2 | 4 | 6 | 74 | 91 | 100 | 100 | 100 | 100 |
| 4 | Crushed wheat & flour (20 g/m²) | Available food (in a petri dish) on mineral layer | Bi-Ex (30 g/m²) | TC | 0 | 0 | 1 | 1 | 2 | 4 | 7 | 6 | 8 | 9 |
| | | | | SO | 0 | 0 | 1 | 1 | 2 | 5 | 8 | 9 | 10 | 11 |
| | | | | EK | 0 | 1 | 2 | 3 | 6 | 8 | 9 | 9 | 10 | 13 |
| 5 | Crushed wheat & flour (20 g/m²) | / | sodium bicarbonate (18 g/m²) | TC | 0 | 0 | 3 | 11 | 26 | 63 | 88 | 96 | 100 | 100 |
| | | | | SO | 0 | 1 | 4 | 9 | 41 | 76 | 88 | 100 | 100 | 100 |
| | | | | EK | 0 | 3 | 6 | 13 | 67 | 84 | 92 | 100 | 100 | 100 |
| 6 | Crushed wheat & flour (20 g/m²) | Available food (in a petri dish) on mineral layer | sodium bicarbonate (18 g/m²) | TC | 0 | 0 | 0 | 0 | 0 | 1 | 1 | 1 | 1 | 1 |
| | | | | SG | 0 | 0 | 0 | 0 | 0 | 0 | 0 | 0 | 1 | 1 |
| | | | | EK | 0 | 0 | 0 | 0 | 2 | 2 | 4 | 4 | 5 | 6 |

From the data above it is evident that the mortality rate of the insects on the mineral layer covering the layer of crushed wheat and flour (conditions 3 and 5) is similar to their mortality rate in the absence of any food and mineral layer (condition 1). Thus, the mineral layer acts as barrier between the insects and their food. Furthermore, if additional food is present in a petri dish on the mineral layer (conditions 4 and 6), the mortality rates are similar to the mortality rate in case where the insects have access to the crushed wheat and flour without any mineral layer (condition 2). This confirms that the mineral layer is not harmful to the insects and in particular is non-parasiticidal.

The invention claimed is:

1. A method for preventing an increase in population of parasites in a food product storage silo without significantly increasing the mortality of the parasites compared to their mortality in the absence of food, said method comprising:

emptying a food product storage silo comprising walls, wherein food product scraps and/or dust are deposited to the walls of the silo after emptying the silo;

after emptying the silo, applying to at least part of the walls a layer of a mineral selected from the group consisting of sodium bicarbonate, potassium bicarbonate, trona, sodium carbonate, potassium carbonate, calcium carbonate, magnesium carbonate, dolomite, sodium sulphate, potassium sulphate, calcium sulphate, magnesium sulphate, magnesium oxide, and mixtures thereof, to cover said food product scraps and/or dust present on the walls of the emptied silo thereby producing a barrier between parasites and said food product scraps and/or dust deposited on walls of the emptied silo, such that the food product is inaccessible for the parasites, the mineral being in the form of particles having an average diameter of at most 70 µm, the mineral being applied as a layer comprising at least 10 g and up to 200 g of the mineral per $m^2$ of wall wherein the layer additionally comprises a co-formulant of the mineral, the co-formulant being selected from the group consisting of: a silica, a diatomaceous earth, an alkaline-earth metal silicate, a clay, a montmorillonite, a zeolite, and mixtures thereof and wherein the parasites are *Tribolium confusum, Sitophilus oryzae* or *Ephestia kuehniella*.

2. The method according to claim 1, wherein the mineral is sodium bicarbonate or trona.

3. The method according to claim 1, wherein applying the layer of the mineral to the wall comprises sprinkling, brushing or spraying the mineral in the form of an aqueous suspension of the mineral, then drying.

4. The method according to claim 1, wherein the layer comprising the mineral is an adhesive layer, and wherein the layer applied to a sheet of galvanized metal of 0.01 $m^2$ placed horizontally thereby providing an upper face of the sheet, the layer being applied to the upper face thereby forming a coated face, retains, after the sheet of galvanized metal has been turned over and placed with the coated face facing the ground, at least 80% of the mineral after one hour.

5. The method according to claim 1, wherein the layer comprising the mineral is a pulverulent layer, and wherein said layer applied to a horizontal sheet of galvanized metal of 0.01 $m^2$, then subjected, at a distance of 60 cm, for 10 minutes, to a jet of air of 2 bar having an initial air speed of 14 m/s, loses at least 20% of the mineral.

6. The method according to claim 1, wherein the layer fills at least part of crevices of the wall.

7. The method according to claim 1, wherein the layer is applied from February to June in the northern hemisphere or from August to December in the southern hemisphere on the wall of the empty food product storage silo.

8. The method according to claim 1, wherein the layer is non-parasiticidal.

9. The method according to claim 1, without being parasite-repellent.

10. The method according to claim 1, wherein applying the layer comprises powdering the mineral and the co-formulant of the mineral.

11. The method according to claim 1, wherein the co-formulant contains silica.

12. The method according to claim 1, wherein applying the layer comprises:

sprinkling, brushing or spraying the mineral in the form of an aqueous suspension of the mineral, then drying; or powdering the mineral.

* * * * *